(12) United States Patent
Wang et al.

(10) Patent No.: US 11,792,117 B2
(45) Date of Patent: *Oct. 17, 2023

(54) PACKET PROCESSING METHOD AND APPARATUS

(71) Applicant: Huawei Technologies Co., Ltd., Shenzhen (CN)

(72) Inventors: Liang Wang, Shenzhen (CN); Xiaoping Fan, Shanghai (CN); Xu Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,520

(22) Filed: Jan. 4, 2022

(65) Prior Publication Data

US 2022/0131792 A1    Apr. 28, 2022

Related U.S. Application Data

(63) Continuation of application No. 16/913,852, filed on Jun. 26, 2020, now Pat. No. 11,240,148, which is a
(Continued)

(30) Foreign Application Priority Data

Dec. 26, 2017   (CN) .......................... 201711428818.3

(51) Int. Cl.
*H04L 45/00*   (2022.01)
*H04L 12/46*   (2006.01)
(Continued)

(52) U.S. Cl.
CPC .......... *H04L 45/38* (2013.01); *H04L 12/4641* (2013.01); *H04L 45/021* (2013.01); *H04L 45/42* (2013.01); *H04L 69/22* (2013.01)

(58) Field of Classification Search
None
See application file for complete search history.

(56) References Cited

U.S. PATENT DOCUMENTS

| 8,930,690 B2 | 1/2015 | Zuo et al. |
| 2013/0254766 A1* | 9/2013 | Zuo ........................ H04L 49/70 718/1 |

(Continued)

FOREIGN PATENT DOCUMENTS

| CN | 103873464 A | 6/2014 |
| CN | 104205080 A | 12/2014 |

(Continued)

OTHER PUBLICATIONS

Firestone et al., "Azure Accelerated Networking: SmartNICs in the Public Cloud," Retrieved from the internet: https://www.microsoft.com/en-us/research/uploads/prod/2018/03/Azure_SmartNIC_NSDI_2018.pdf, total 14 pages (Feb. 2018).

*Primary Examiner* — Christine T Duong
(74) *Attorney, Agent, or Firm* — Leydig, Voit & Mayer, Ltd.

(57) ABSTRACT

A packet processing method and a related apparatus are provided. The method includes: obtaining a first packet including first indication information, wherein the first indication information is used to indicate a data flow corresponding to the first packet; determining a target flow entry in an integrated flow table based on the first indication information, wherein the integrated flow table includes at least one flow entry, each flow entry includes a unified match entry and a comprehensive behavior entry, the unified match entry uniquely identifies a data flow, a unified match entry of the target flow entry identifies the same data flow as indicated by the first indication information; and performing
(Continued)

an operation on the first packet based on a comprehensive behavior entry included in the target flow entry.

20 Claims, 8 Drawing Sheets

Related U.S. Application Data continuation of application No. PCT/CN2018/122200, filed on Dec. 19, 2018.

(51) Int. Cl.
*H04L 45/021* (2022.01)
*H04L 45/42* (2022.01)
*H04L 69/22* (2022.01)

(56) References Cited

U.S. PATENT DOCUMENTS

| | | |
|---|---|---|
| 2015/0256459 A1 | 9/2015 | Yu et al. |
| 2016/0380885 A1 | 12/2016 | Jani et al. |

FOREIGN PATENT DOCUMENTS

| | | | |
|---|---|---|---|
| CN | 104348725 A | 2/2015 | |
| CN | 104426768 A | 3/2015 | |
| CN | 106936777 A | 7/2017 | |
| EP | 2828760 A1 | 1/2015 | |
| WO | 2013142041 A1 | 9/2013 | |
| WO | 2015032333 A1 | 3/2015 | |
| WO | WO-2015032333 A1 * | 3/2015 | ............ H04L 45/38 |
| WO | 2015131720 A1 | 9/2015 | |
| WO | 2018023499 A1 | 2/2018 | |

\* cited by examiner

United States Patent (10) Patent No.: US 11,792,117 B2

PACKET PROCESSING METHOD AND APPARATUS

CROSS-REFERENCE TO RELATED APPLICATIONS

This application is a continuation of U.S. patent application Ser. No. 16/913,852, filed on Jun. 26, 2020, which is a continuation of International Application No. PCT/CN2018/122200, filed on Dec. 19, 2018, which claims priority to Chinese Patent Application No. 201711428818.3, filed on Dec. 26, 2017. All of the afore-mentioned patent applications are hereby incorporated by reference in their entireties.

TECHNICAL FIELD

Embodiments of this application relate to the communications field, and in particular, to a packet processing method and an apparatus.

BACKGROUND

In a conventional data center, a server or host runs an operating system. The server is connected to a physical switch, and the physical switch forwards data between different hosts. After computing virtualization, one host is virtualized into a plurality of virtual machines, and virtual machines in a same host forward data by using a virtual switch, for example, an open virtual switch (OVS). Usually, a data flow enters a virtual switch by using a network interface card. When a packet of a new data flow enters the virtual switch for the first time, the virtual switch analyzes the packet of the data flow, determines how to process the packet, finally records a processing process of the packet, generates a related flow entry, and fills the flow entry into a software flow table. When a subsequent packet of the data flow flows into the virtual switch, the virtual switch hits a corresponding flow entry in the software flow table based on information about the packet, and then directly performs a behavior indicated in the flow entry, to complete packet processing, for example, forwarding, by using a network interface card, the packet to another device after encapsulating or decapsulating the packet.

It can be learned that a flow table matching process and a flow entry behavior execution process directly affect packet processing performance of the virtual switch. To improve packet processing efficiency, in the prior art, a software flow table is offloaded to a network interface card, a hardware flow table is generated, and the software flow table and the hardware flow table are synchronized. When a packet passes through the network interface card, the network interface card directly hits a corresponding hardware flow entry in the hardware flow table based on information about the packet, further performs corresponding processing on the packet based on the hit hardware flow entry, and no longer forwards the packet to a virtual switch. In this way, the packet processing efficiency can be improved.

However, because a virtual network topology is relatively complex, there may be a plurality of multi-level flow tables. After a data packet enters a host, a plurality of times of flow table search and matching usually need to be completed. Consequently, the processing efficiency decreases. In addition, because storage space of the network interface card is limited, it is difficult to store a large quantity of hardware flow tables. To be specific, only some flow entries in the software flow table can be maintained in the hardware flow table. Consequently, a hit rate of the hardware flow table is reduced. Further, some data packets still need to be sent to the virtual switch for processing. This also decreases the packet processing efficiency. Therefore, the packet processing efficiency that is based on the virtual switch in the prior art still needs to be improved.

SUMMARY

This application provides a packet processing method and an apparatus, to improve packet processing efficiency, especially when storage space of a network interface card is limited.

According to a first aspect, a packet processing method is provided. The method includes: obtaining, by a packet processing apparatus, a first packet, where the first packet includes first indication information, the first indication information is used to indicate a data flow corresponding to the first packet, the packet processing apparatus stores an integrated flow table, the integrated flow table includes at least one flow entry, each of the at least one flow entry includes a unified match entry and a comprehensive behavior entry, the unified match entry uniquely identifies a data flow, and the comprehensive behavior entry is used to indicate at least one operation performed on a packet in the data flow identified by the unified match entry; determining a target flow entry in the integrated flow table based on the first indication information, where a unified match entry of the target flow entry identifies the same data flow as indicated by the first indication information; and performing the at least one operation on the first packet based on a comprehensive behavior entry included in the target flow entry. According to the method provided in this embodiment of this application, packet processing is performed based on a new flow table, that is, the integrated flow table. Because one unified match entry in the integrated flow table can uniquely identify one data flow, a plurality of times of flow table search may be normalized into one time of flow table search, so that flow table matching efficiency is improved and occupied storage space is reduced. When storage space of a network interface card is limited, the network interface card can store more flow tables, so that a hit rate between a packet and a hardware flow table is improved, and packet processing efficiency is improved.

In a possible implementation, the packet processing apparatus generates the unified match entry by extracting characteristic information of the packet, to uniquely identify a data flow (or a connection) in which the packet is located; moreover, tracks all flow tables and connection track (CT) tables that are passed through by a packet of a data flow in a virtual switch, to record behavior entries indicated by all flow entries hit by the packet; integrates these behavior entries into one comprehensive behavior entry; and then generates an integrated flow entry based on the unified match entry and the comprehensive behavior entry, and adds the generated integrated flow entry to the integrated flow table. Because the unified match entry can uniquely identify a data flow (or a connection), and the comprehensive behavior entry corresponding to the unified match entry describes all operations or behaviors performed on each packet of the data flow, a plurality of flow entries in a multi-level flow table of the virtual switch may be integrated into one integrated flow entry in the integrated flow table, to fully reduce occupied storage space, so that more flow entries can be stored in limited hardware storage space. Further, a flow table hit rate can be improved. In addition, a plurality of times of flow table search may be normalized into one time of flow table search, so that a search and matching speed is improved, and packet processing efficiency is further improved.

In a possible implementation, when the behavior entries are integrated into the comprehensive behavior entry, some redundant behaviors in all recorded behavior entries may be removed, to further improve the packet processing efficiency.

In a possible implementation, before the determining a target flow entry in the integrated flow table based on the first indication information, the method further includes: obtaining a second packet, where the second packet includes second indication information, the second indication information is used to indicate a data flow corresponding to the second packet, and the data flow corresponding to the second packet is the same as the data flow corresponding to the first packet; and generating the unified match entry based on the second indication information included in the second packet. Before the first packet is sent, the unified match entry may be generated based on the second indication information carried in the second packet, and the target flow entry is generated. Because the data flow corresponding to the second packet is the same as the data flow corresponding to the first packet, the unified match entry may be used to match the first packet. After the first packet is obtained, the first packet does not need to be sent to a software environment, and may be processed based on the target flow entry stored in the network interface card, so that processing efficiency of the first packet is improved.

In a possible implementation, before the determining a target flow entry in the integrated flow table based on the first indication information, the method further includes: sending the second packet to a virtual switch in the packet processing apparatus; performing, by the virtual switch, at least one operation on the second packet to complete forwarding of the second packet; and generating the comprehensive behavior entry based on the at least one operation performed by the virtual switch on the second packet. Because the data flow corresponding to the second packet is the same as the data flow corresponding to the first packet, an operation that needs to be performed to forward the second packet is the same as an operation that needs to be performed to forward the first packet. In this embodiment, the comprehensive behavior entry includes information about the operation that needs to be performed to forward the second packet. Therefore, the operation that needs to be performed to send the first packet can be determined once without searching for a behavior entry a plurality of times, so that forwarding efficiency of the first packet is improved.

In a possible implementation, the generating the comprehensive behavior entry based on an operation performed to send a second packet includes: determining a redundancy operation in the at least one operation performed by the virtual switch on the second packet, where the redundancy operation is an operation that does not need to be performed when the second packet is forwarded by using a network interface card of the packet processing apparatus; and generating the comprehensive behavior entry, where the comprehensive behavior entry includes information used to indicate an operation other than the redundancy operation in the at least one operation performed by the virtual switch on the second packet. In this embodiment, redundancy operation information in the comprehensive behavior entry is deleted. Therefore, storage space occupied by a flow table is reduced. When the storage space of the network interface card is limited, the network interface card can store more flow tables, so that the hit rate between a packet and a hardware flow table is improved, and the packet forwarding efficiency is further improved.

In a possible implementation, the second packet is an initial packet in the data flow corresponding to the second packet.

In a possible implementation, the unified match entry includes a source internet protocol (IP) address, a source port number, a destination IP address, a destination port number, a transport layer protocol number, and a subnet identifier that correspond to the data flow indicated by the first indication information. The foregoing six pieces of information may uniquely identify a data flow. This embodiment of this application is not limited thereto. Other information that can uniquely identify a data flow may also be used as a unified match entry.

In a possible implementation, the target flow entry is a flow entry in a hardware flow table. The comprehensive behavior entry includes information used to indicate a connection track (CT) operation and a virtual extensible local area network (VxLAN) encapsulation operation, and the performing the at least one operation on the first packet based on a comprehensive behavior entry included in the target flow entry includes: performing the CT operation on the first packet based on the information indicating the CT operation in the comprehensive behavior entry; performing, based on the information indicating the VxLAN encapsulation operation in the comprehensive behavior entry, the VxLAN encapsulation operation on the first packet obtained after the CT operation, to generate a third packet; and sending the third packet.

In a possible implementation manner, when the comprehensive behavior entry of the flow entry in the hardware flow table is generated, a redundancy operation may be removed to reduce a size of the integrated flow entry. For example, in a process of sending the second packet, operations of adding and deleting an internal virtual local area network (VLAN) tag may need to be performed on the second packet, because the second packet needs to pass through a plurality of bridges in the sending process in a software environment. Therefore, the operations of adding and deleting the internal VLAN tag need to be performed. In a hardware environment, the first packet does not need to pass through a plurality of bridges in a sending process. Therefore, the operations of adding and deleting the internal VLAN tag are meaningless and are redundancy operations, and the two behaviors may be removed when the comprehensive behavior entry is generated.

According to a second aspect, a packet processing apparatus is provided. The apparatus may implement a function of an execution body of the method according to any one of the first aspect or the implementations of the first aspect. The function may be implemented by hardware, or may be implemented by hardware executing corresponding software. The hardware or the software includes one or more units or modules corresponding to the foregoing function.

In a possible design, the apparatus includes a processor and a communications interface. The processor is configured to support the apparatus in performing a corresponding function in the method according to the first aspect. The communications interface is configured to support communication between the apparatus and another communications device. Further, the apparatus may further include a memory. The memory is configured to couple to the processor, and stores a program instruction and data that are necessary to the apparatus.

According to a third aspect, a computer-readable storage medium is provided. The computer-readable storage medium stores a computer program. When the computer program is executed by a processing unit or a processor, a packet processing apparatus is enabled to perform the method according to any one of the first aspect or the implementations of the first aspect.

According to a fourth aspect, a chip is provided. The chip stores an instruction. When the instruction is run on a packet processing apparatus, the chip is enabled to perform the method according to any one of the first aspect or the implementations of the first aspect.

According to a fifth aspect, a computer program product is provided. The computer program product includes a computer program. When the computer program is run by a communications unit or a communications interface, and a processing unit or a processor of a packet processing apparatus, the packet processing apparatus is enabled to perform the method according to any one of the first aspect or the implementations of the first aspect.

According to a sixth aspect, a network interface card is provided. The network interface card includes a storage unit, a processing unit, and a communications unit. The storage unit is configured to store an integrated flow table. The integrated flow table includes at least one flow entry. Each of the at least one flow entry includes a unified match entry and a comprehensive behavior entry. The unified match entry uniquely identifies a data flow. The comprehensive behavior entry is used to indicate at least one operation performed on a packet in the data flow identified by the unified match entry. The communications unit is configured to obtain a first packet. The first packet includes first indication information. The first indication information is used to indicate a data flow corresponding to the first packet.

The processing unit is configured to determine a target flow entry in the integrated flow table based on the first indication information, where a unified match entry of the target flow entry identifies the same data flow as indicated by the first indication information; and perform the at least one operation on the first packet based on a comprehensive behavior entry included in the target flow entry.

According to a seventh aspect, an offload engine is provided. The offload engine is configured to: generate a unified match entry based on indication information included in a second packet, generate a comprehensive behavior entry based on at least one operation performed by a virtual switch on the second packet, generate a flow entry based on the unified match entry and the comprehensive behavior entry, and add the generated flow entry to an integrated flow table.

In a possible implementation, the virtual switch is configured to perform the at least one operation on the second packet to complete forwarding of the second packet.

In a possible implementation, the unified match entry includes a source internet protocol IP address, a source port number, a destination IP address, a destination port number, a transport layer protocol number, and a subnet identifier of a data flow corresponding to the second packet.

In a possible implementation, the offload engine is specifically configured to: determine a redundancy operation in the at least one operation performed by the virtual switch on the second packet, where the redundancy operation is an operation that does not need to be performed when the second packet is forwarded by using a network interface card of a packet processing apparatus; and generate the comprehensive behavior entry, where the comprehensive behavior entry includes information used to indicate an operation other than the redundancy operation in the at least one operation performed by the virtual switch on the second packet.

In a possible implementation, the offload engine is integrated into the virtual switch.

According to an eighth aspect, a packet processing apparatus is provided. The apparatus includes the network interface card described in the sixth aspect and the offload engine described in any one of the seventh aspect or the implementations of the seventh aspect.

According to a ninth aspect, a computer-readable storage medium is provided. The computer-readable storage medium stores a computer program. When the computer program is executed by a processing unit or a processor, a function of the network interface card described in the sixth aspect is implemented, or a function of the offload engine described in any one of the seventh aspect or the possible implementations of the seventh aspect.

According to a tenth aspect, a computer program product is provided. The computer program product includes a computer program. When the computer program is run by a communications unit or a communications interface, and a processing unit or a processor of a network interface card, the network interface card is enabled to implement a function in the sixth aspect.

DESCRIPTION OF EMBODIMENTS

The following describes technical solutions of this application with reference to the accompanying drawings. Embodiments of this application provide a packet processing method and an apparatus that are based on an integrated flow table, and may be typically applied to a virtual network system in which a virtual switch is used to forward data. A virtual switch is a software application used to exchange a data packet between virtual machines, and is also referred to as a software switch. An open virtual switch (OVS) is used as an example below to describe the packet processing methods and the apparatuses that are provided in the embodiments of this application. It may be understood that the packet processing methods and the apparatuses that are based on the integrated flow table and that are provided in this application are further applicable to a network system in which another type of virtual switch is used.

Figure 1:
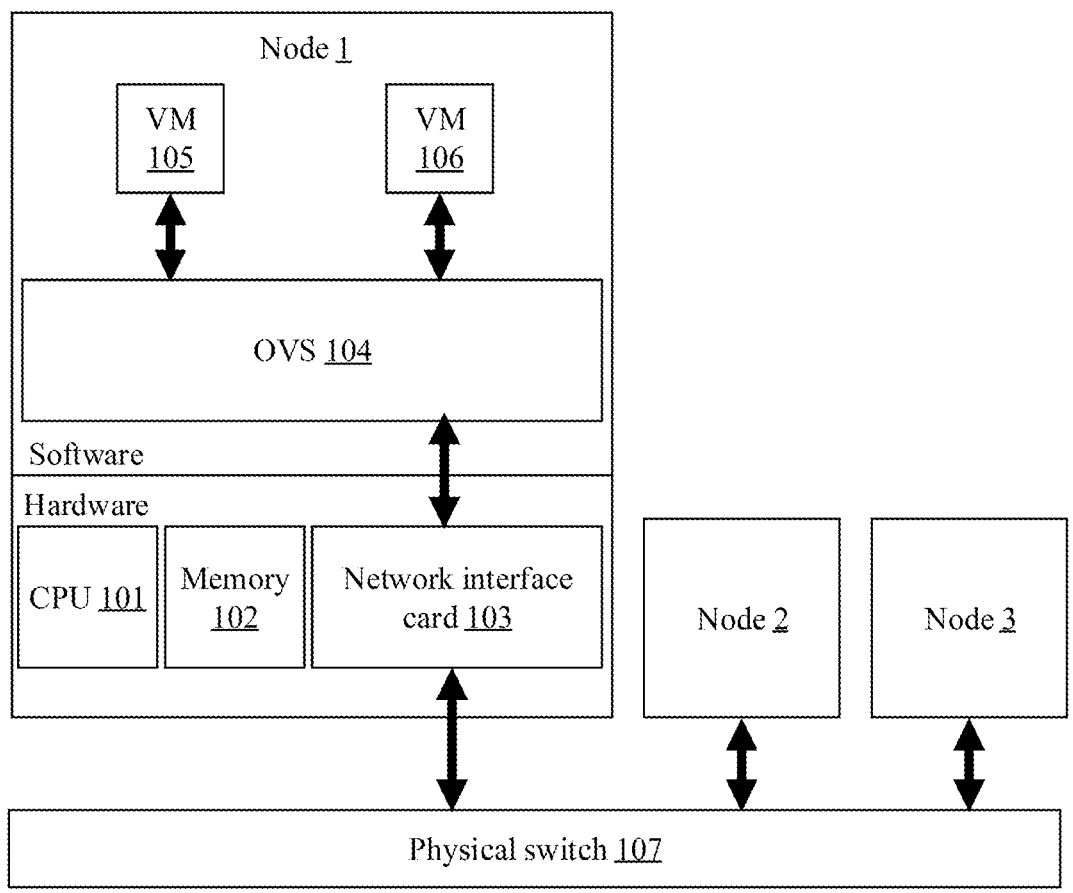
FIG. 1 is a schematic diagram of a virtual network system according to an embodiment of this application.

FIG. 1 is a schematic diagram of a virtual network system in which an OVS is used.

A node 1, a node 2, and a node 3 are three physical hosts or servers in which OVS software is installed and in which a network interface card (NIC) is configured. The three nodes transmit information by using a physical switch 107. Each node has complete software and hardware. For brevity, FIG. 1 merely shows an example of software and hardware included in the node 1.

As shown in FIG. 1, the hardware of the node 1 includes a central processing unit 101 (CPU), a memory 102, and a network interface card 103; and the software of the node 1 includes an OVS 104, a virtual machine (VM) 105, and a VM 106. The VM 105 and the VM 106 on the node 1 communicate with another node by using the OVS 104 and the network interface card 103.

The foregoing virtual network system is merely an example for description, and a virtual network system applicable to this application is not limited thereto. For example, a container or other virtual operating system software may be further installed in the node 1, there may be another quantity of nodes, and hardware included in each node is not limited to the hardware shown in FIG. 1.

Figure 2:
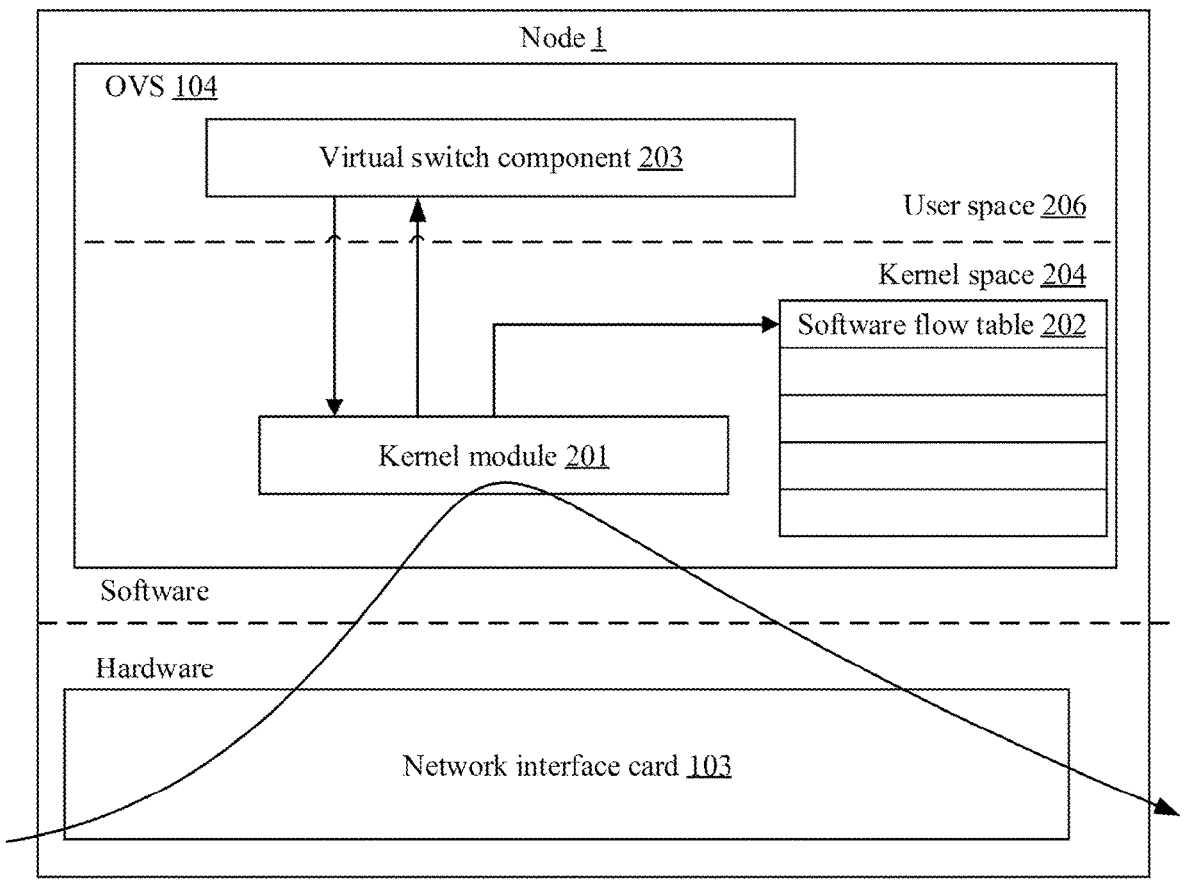
FIG. 2 is a schematic diagram of a node in a virtual network system.

FIG. 2 is a schematic diagram of a basic process in which the node 1 in the virtual network system shown in FIG. 1 processes a packet.

Referring to FIG. 2, the OVS 104 includes a virtual switch component 203 running in user space 206, for example, ovs-vswitchd, and a kernel module 201 running in kernel space 204. The virtual switch component 203 is mainly responsible for implementing data exchange and flow table functions, and is a core component of the OVS 104. In an embodiment, the virtual switch component 203 may be implemented as one user-mode daemon process or a group of user-mode daemon processes. A flow table is a table that describes which type of processing is to be performed on a packet of which type of data flow and that records a quantity of processing execution times, and includes a flow entry. A flow entry is used to specifically describe how to process a specific type of data packet. A flow entry usually includes content such as a match entry (also referred to as a "match key value"), a behavior entry, and a flow entry timeout time. The kernel module 201 is configured to perform a specific operation on a packet based on a flow table, for example, perform specific processing on the packet and then forward the processed packet. The virtual switch component 203 directly communicates with the kernel module 201 by using a specific communications protocol, for example, the netlink protocol. When the initial packet of a data flow arrives at the network interface card 103, the network interface card 103 sends the packet to the OVS 104. Because the packet is the initial packet in the data flow that arrives at the network interface card 103, and a software flow table 202 located in the kernel space 204 of the OVS 104 does not have a flow entry corresponding to the packet, the kernel module 201 sends the packet to the virtual switch component 203 in the user space 206. The virtual switch component 203 analyzes information carried in the packet, and determines how to process the packet. After packet processing is completed, the virtual switch component 203 records a processing process and generates a corresponding flow entry, and adds the flow entry to the software flow table 202. When a subsequent packet of the data flow enters from the network interface card 103, the kernel module 201 may hit a corresponding flow entry in the software flow table 202 based on characteristic information of the packet, for example, 5-tuple information (a source IP address, a source port number, a destination IP address, a destination port number, and a transport layer protocol number); and further, perform a behavior (which may also be referred to as an "operation") described in the flow entry, for example, outputting to a specified port, adding or removing a VLAN tag, adding or removing a VxLAN header, modifying a data packet header, jumping to another flow table, dropping, or performing a CT behavior. Therefore, the packet does not need to enter the user space 206 again, and can be processed more quickly. Usually, a packet processing process in which the user space is passed through may be referred to as a "slow path", and a process in which a packet is directly processed in the kernel space based on software flow table matching and the user space is not passed through may be referred to as a "fast path".

Figure 3:
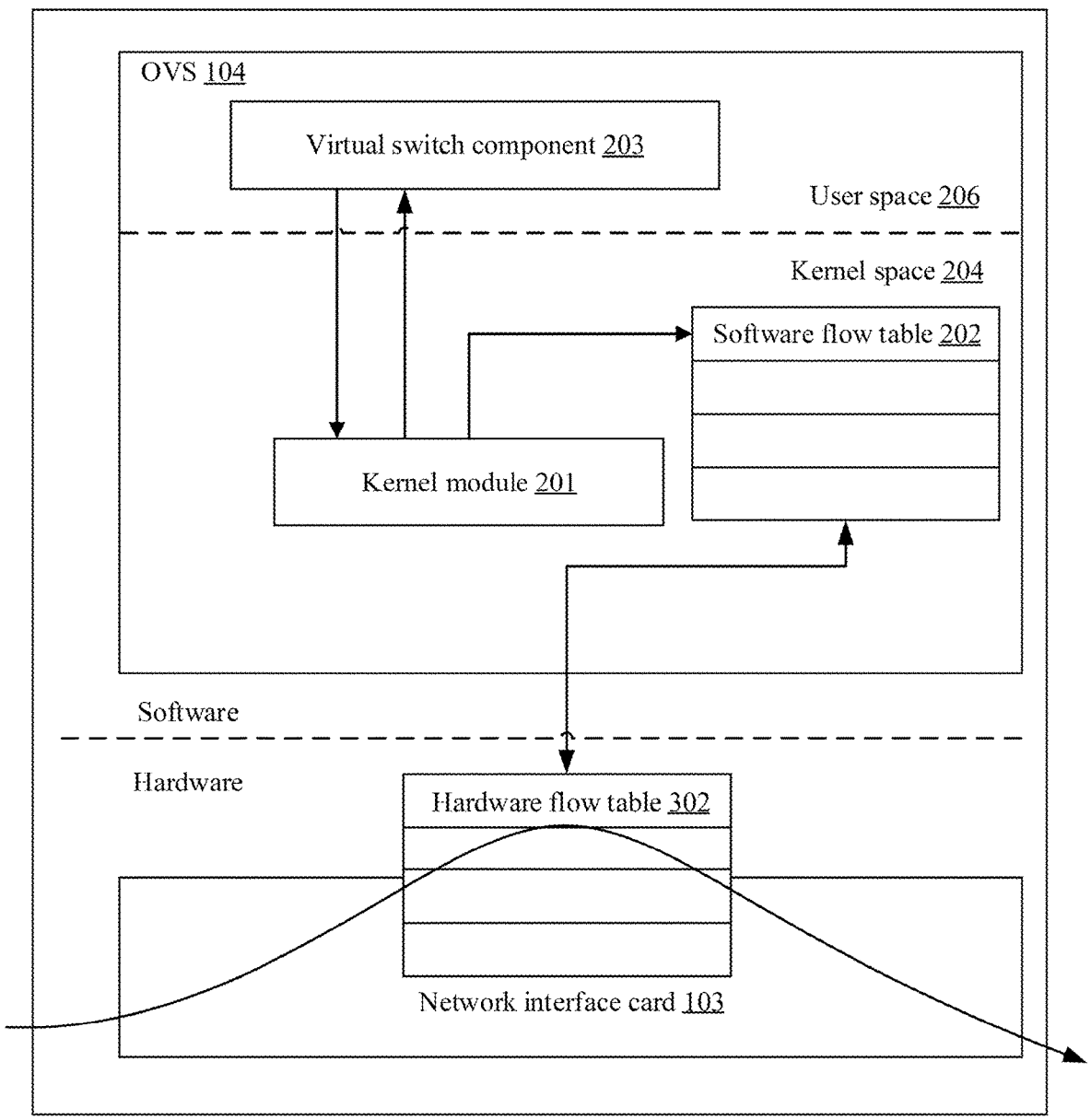
FIG. 3 is another schematic diagram of a node in a virtual network system.

To further improve a packet processing speed, a matching operation of a software flow table may be offloaded to hardware, to be specific, a hardware flow table is stored in hardware, for example, a network interface card, the software flow table and the hardware flow table are synchronized, and then a flow table matching operation originally performed in the kernel space is offloaded to the hardware for implementation, so that the packet processing speed is improved. As shown in FIG. 3, the network interface card 103 stores a hardware flow table 302, and the hardware flow table 302 keeps synchronous with the software flow table 202 located in the kernel space 204. After a packet flows in from the network interface card 103, the packet hits a corresponding flow entry in the hardware flow table 302 stored in the network interface card 103, and then a behavior indicated by the flow entry is performed. In this way, the packet does not need to be sent to the OVS 104 for processing, and is directly processed on the network interface card 103. Therefore, the packet processing speed can be improved.

However, in an application scenario such as a public cloud scenario, a virtual network topology is relatively complex, and there are a plurality of multi-level flow tables. After a packet enters a network interface card, a plurality of times of flow table matching needs to be completed, and this is time-consuming. In addition, when storage space of the network interface card is extremely limited, it is difficult to store all software flow tables in the network interface card. Consequently, packets of some data flows cannot hit corresponding flow entries in a hardware flow table. In other words, a hit rate of the hardware flow table is lower than that of the software flow table, and some packets still need to be processed by using the kernel module 201 in the kernel space 204, thereby reducing packet processing efficiency. However, increasing the storage space of the network interface card increases manufacturing costs, and a balance between a flow table hit rate and storage space usage cannot be achieved.

In view of this, in this embodiment of this application, a new flow table structure, namely, an integrated flow table, is designed based on a typical application scenario of a virtual network, for example, a public cloud scenario. All flow tables and connection track (CT) tables passed through by a packet of a data flow in an OVS are tracked by using an offload engine, to record behavior entries indicated by all flow entries hit by the packet, and integrate these behavior entries into one comprehensive behavior entry. In addition, a data flow (or a connection) is uniquely identified by using a specially designed unified match entry, to avoid that a quantity of flow entries is increased because a data flow has a plurality of match key values. Then, an integrated flow entry is generated based on the unified match entry and the comprehensive behavior entry, and the generated integrated flow entry is added to the integrated flow table. By using the integrated flow table, a plurality of times of flow table search may be normalized into one time of flow table search, so that flow table matching efficiency is improved, and occupied storage space is reduced.

Further, an embodiment of this application further provides an integrated flow table generation method and a packet processing method that is based on an integrated flow table. The method mainly includes the following core procedures:

(1) After a packet flows into a network interface card from an external network, the network interface card searches, based on characteristic information of the packet, an integrated flow table maintained by the network interface card for a corresponding flow entry. If no flow entry is hit, the network interface card forwards the packet to an OVS for processing. When the OVS processes the packet, an offload engine tracks a processing process of the packet, records all flow tables and CT tables passed through by the packet, and sequentially records flow entry behaviors and CT behaviors that are performed on the packet.

(2) After the processing process of the packet is recorded, a subnet identifier of the packet is extracted, and a unified match entry of an integrated flow entry is generated with reference to the subnet identifier of the packet and 5-tuple information. The recorded behaviors are centrally orchestrated, unnecessary behaviors are removed, and behaviors that can be combined are integrated, to generate a comprehensive behavior. The comprehensive behavior is used as a comprehensive behavior entry of the integrated flow entry. A complete integrated flow entry is finally constructed by establishing an association relationship between the unified match entry and the comprehensive behavior entry, and is added to the integrated flow table. The integrated flow table may be offloaded to the network interface card, in other words, stored in a memory of the network interface card.

(3) After a subsequent packet flows into the network interface card from the external network, the network interface card searches, based on characteristic information of the packet, the integrated flow table for a corresponding flow entry. If a flow entry is hit, the network interface card directly processes the packet based on a comprehensive behavior entry of the hit integrated flow entry, and does not need to send the packet to the OVS for processing.

In this embodiment of the present invention, a plurality of flow entries of a multi-level flow table in the OVS are integrated into one integrated flow entry in the integrated flow table, so that occupied storage space is reduced. When a hardware storage resource is limited, more flow entries can be stored, so that more data flows can hit flow entries in the integrated flow table, and the data processing efficiency is ensured.

Figure 4:
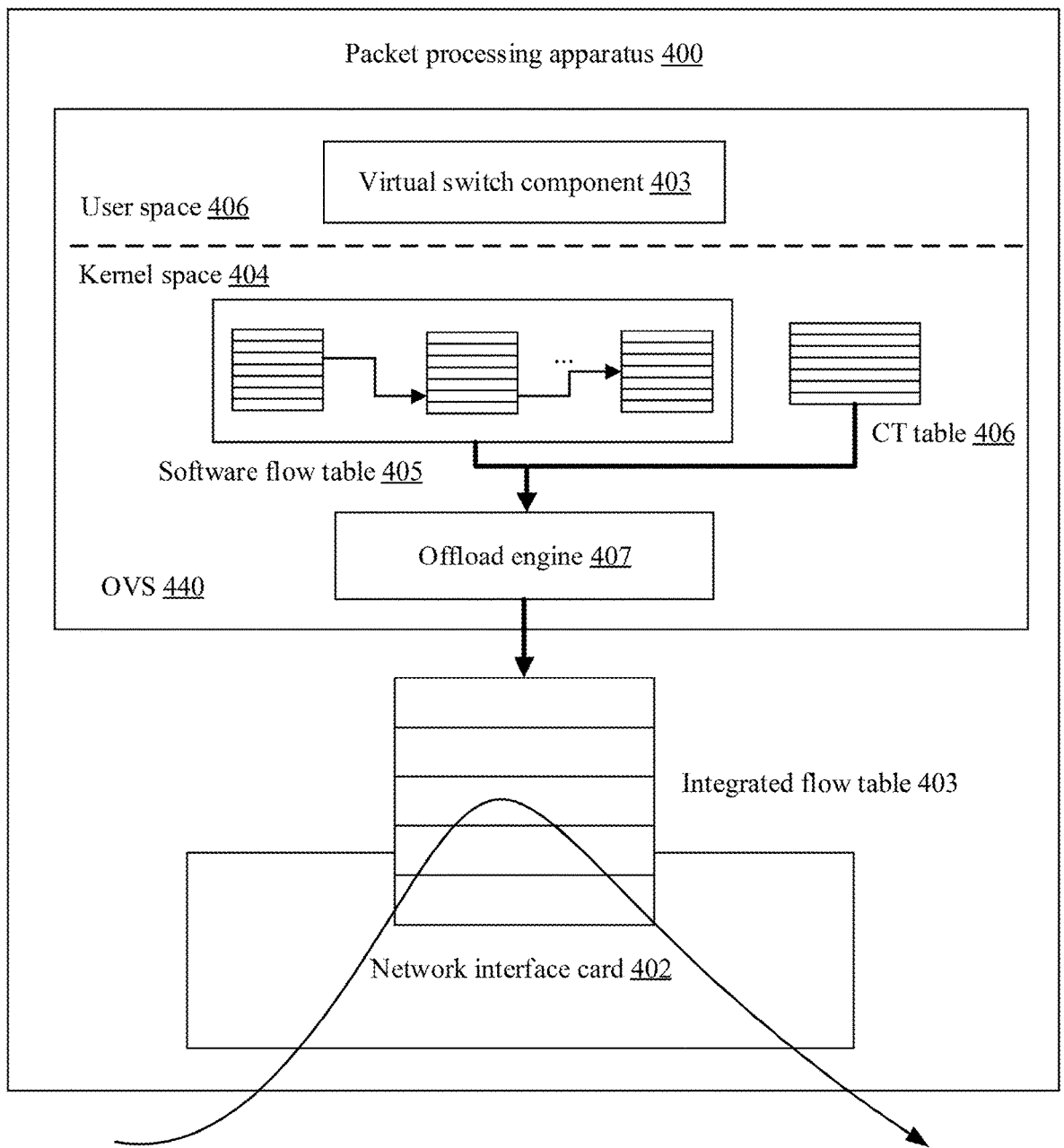
FIG. 4 is a schematic diagram of a packet processing apparatus according to this application.

FIG. 4 shows an example of a packet processing apparatus 400 for performing packet processing based on an integrated flow table 403. The packet processing apparatus 400 may be any one of the node 1, the node 2, and the node 3 shown in FIG. 1. As shown in FIG. 4, the packet processing apparatus 400 includes a network interface card 402, an offload engine 407, and an OVS 440 that is implemented by hardware (for example, a CPU and a memory). The offload engine 407 is configured to: track a software flow table 405 and a CT table 406 passed through by a packet in the OVS 440; comprehensively orchestrate all performed flow table behaviors and CT behaviors, to generate an integrated flow entry including a unified match entry and a comprehensive behavior entry; finally add the integrated flow entry to the integrated flow table 403; and after a subsequent packet enters the network interface card, if the subsequent packet hits an integrated flow entry in the integrated flow table 403, perform processing based on the integrated flow entry.

In an embodiment, the integrated flow table 403 may be maintained by the OVS 440. For example, the integrated flow table 403 is located in kernel space 404 of the OVS 440. After receiving a packet, the network interface card 402 forwards the packet to the OVS 440. The OVS 440 hits, based on information about the packet, a corresponding flow entry in the integrated flow table maintained by the OVS 440, and further performs a corresponding operation on the packet. By using the integrated flow table, OVS 440 can normalize a plurality of times of flow table search into one time of flow table search, so that flow table matching efficiency is improved.

In another embodiment, to improve a flow table search speed, the integrated flow table 403 may be stored in a memory integrated into the network interface card 402, or may be stored in a memory externally connected to the network interface card 402, that is, the integrated flow table 403 is a hardware integrated flow table. After receiving a packet, the network interface card 402 directly hits, based on information about the packet, a corresponding flow entry in the hardware integrated flow table maintained by the network interface card 402, further performs a corresponding operation on the packet, and does not need to forward the packet to the OVS for processing, so that a packet processing speed is greatly improved.

It should be noted that the offload engine 407 shown in FIG. 4 is a software module or program in the kernel space 404 of the OVS 440. When the module or program is executed by a processor, a corresponding function is implemented. In an embodiment, a function of the offload engine 407 may be integrated into a kernel module of the OVS 440. It may be understood that the offload engine 407 provided in this embodiment of this application may be further implemented as a software module or program in the user space 404 of the OVS 440, for example, integrated into a virtual switch component in the user space 404. Alternatively, the offload engine 407 may be implemented in a form of hardware, for example, implemented as a processor, a digital signal processor (DSP), an application-specific integrated circuit (ASIC), a field programmable gate array (FPGA) or another programmable logic device, a transistor logic device, a hardware component, or any combination thereof. This is not limited in this application.

Based on the foregoing packet processing apparatus 400, the following describes in detail related technical details of processing a packet by using an integrated flow table.

Figure 5:
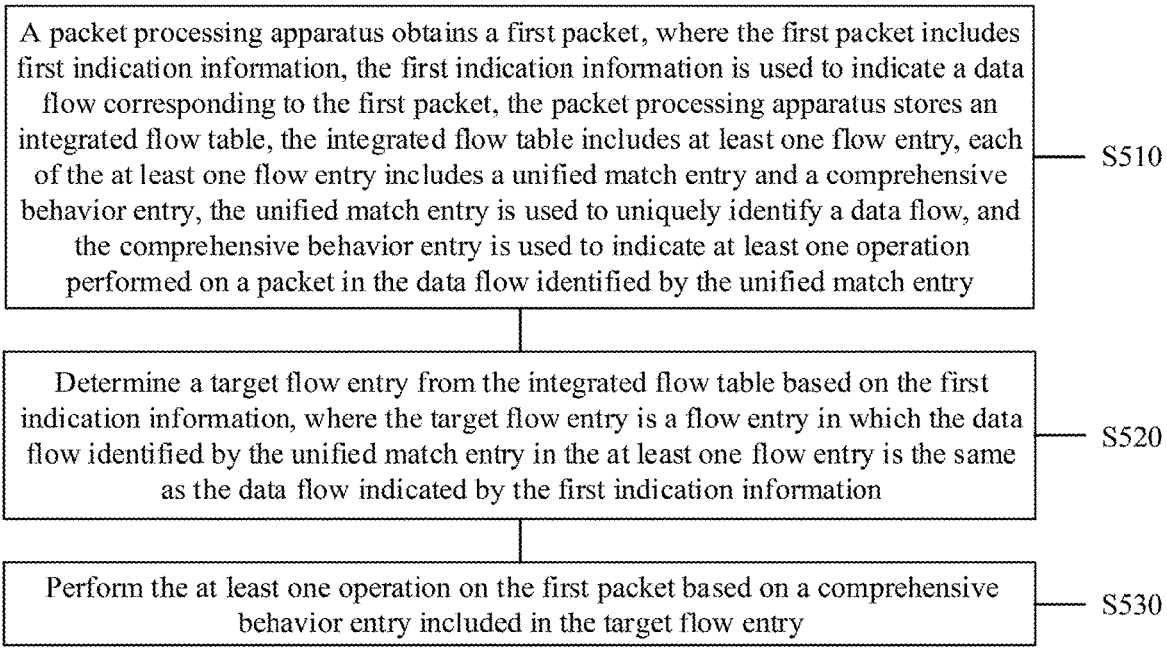
FIG. 5 is a schematic diagram of a packet processing method according to this application.

FIG. 5 is a schematic flowchart of a method for processing a packet based on an integrated flow table. The method 500 includes the following steps:

S510: The packet processing apparatus 400 obtains a packet (which is referred to as a "first packet" below), where the first packet includes first indication information, the first indication information is used to indicate a data flow corresponding to the first packet, the packet processing apparatus 400 stores an integrated flow table, the integrated flow table includes at least one flow entry, each of the at least one flow entry includes a unified match entry and a comprehensive behavior entry, the unified match entry uniquely identifies a data flow, and the comprehensive behavior entry is used to indicate at least one operation performed on a packet in the data flow identified by the unified match entry; and the data flow corresponding to the first packet is specifically a data flow to which the first packet belongs.

S520: Determine a target flow entry in the integrated flow table based on the first indication information, where a unified match entry of the target flow entry identifies the same data flow as indicated by the first indication information.

S530: Perform the at least one operation on the first packet based on a comprehensive behavior entry included in the target flow entry.

In an example, steps S510 to S530 may be performed by the network interface card 402. In another example, steps S510 to S530 may be performed by the OVS 440.

The first packet may be any packet obtained by the packet processing apparatus 400, for example, may be a packet received by the packet processing apparatus 400 from another communications device by using the network interface card 402, or may be a packet generated by a VM installed in the packet processing apparatus 400. Indication information of the packet is used to indicate characteristic information of a data flow to which the packet belongs. The indication information may be specifically several fields carried in a header of the packet. These fields are carried in all packets that belong to a same data flow, in other words, packets that belong to a same data flow have same indication information. In an embodiment, the indication information of the packet may be a source IP address (SIP), a source port number (SPORT), a destination IP address (DIP), a destination port number (DPORT), a transport layer protocol number (IP type), and a subnet identifier. The information may be used to uniquely identify a data flow (which may also be referred to as a "connection"). This is not limited in this embodiment of this application. Other information that can be used to uniquely identify a data flow may also be used as the first indication information.

The unique identification in the method 500 means that a unified match entry A corresponds only to a data flow A', and the data flow A' corresponds only to the unified match entry A. In other words, when the integrated flow table includes a plurality of integrated flow entries, the plurality of integrated flow entries are in a one-to-one correspondence with a plurality of data flows.

The subnet identifier may be a VLAN identifier (ID), a VxLAN network identifier (VNI), or an input port number. However, a subnet identifier applicable to this application is not limited thereto. When there are a plurality of layers of subnets, the subnet identifier is obtained by combining a plurality of subnet identifiers.

After obtaining the first packet, the packet processing apparatus 400 determines the target flow entry in the flow table based on the first indication information carried in the first packet. A method for determining a target flow entry is, for example, determining, through comparison, whether the first indication information matches the unified match entry of the flow entry. When the unified match entry matches the first indication information, the flow entry is the target flow entry. When the unified match entry does not match the first indication information, the flow entry is a non-target flow entry, where the unified match entry partially or completely matches the first indication information.

Because the flow entry corresponding to the first packet can be determined through only one time of match, the flow entry provided in this application is referred to as an integrated flow entry, and correspondingly, a flow table including an integrated flow entry is referred to as an integrated flow table.

Figure 6:
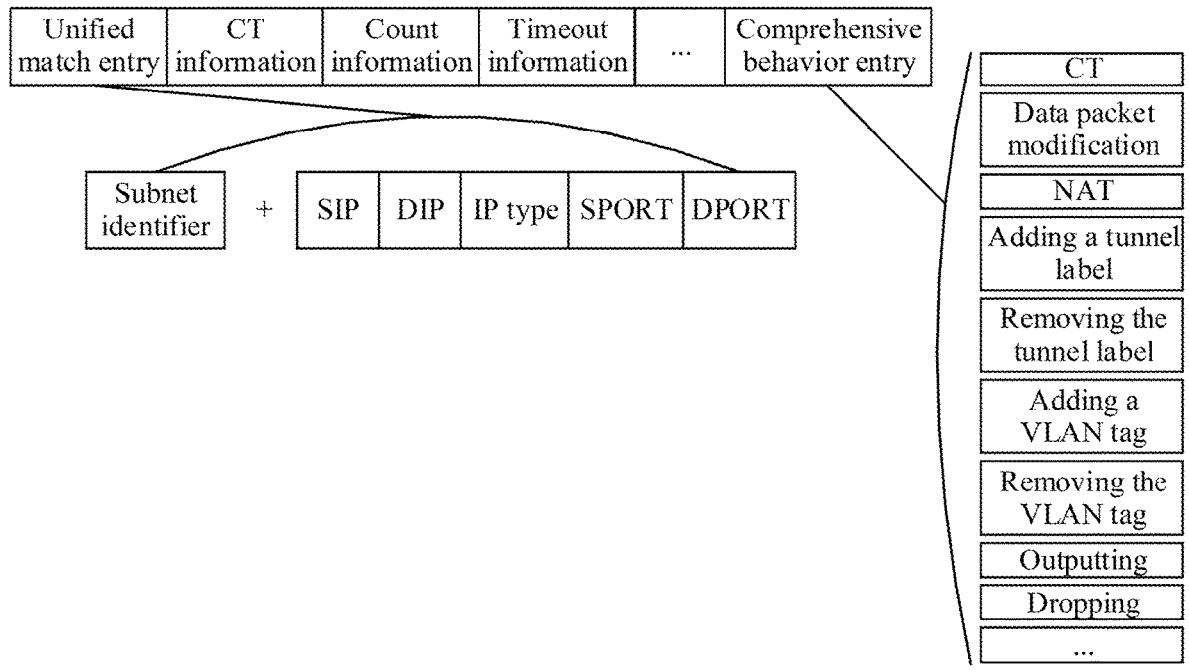
FIG. 6 is a schematic diagram of an integrated flow entry according to this application.

FIG. 6 is a schematic structural diagram of an integrated flow entry according to this application.

As shown in FIG. 6, the integrated flow entry includes a unified match entry and a comprehensive behavior entry. In an embodiment, an operation (which may also be referred to as a "behavior") indicated by the comprehensive behavior entry includes but is not limited to at least one of the following: CT, packet modification, and network address translation (NAT), adding a tunnel label (tunnel push), removing a tunnel label (tunnel pop), adding an internal VLAN tag (VLAN push), removing an internal VLAN tag (VLAN pop), outputting (output), and dropping (drop).

The integrated flow entry may further include statistics information such as timeout information (timeout info), CT information (CT info), and count information (counter info).

The integrated flow entry shown in FIG. 6 may be a flow entry in a software flow table, or may be a flow entry in a hardware flow table. In other words, the integrated flow table may be a software integrated flow table, or may be a hardware integrated flow table.

The foregoing example is merely an example for description. Specific content of the integrated flow entry is not limited in this application. Any information that may be used to match and determine a data flow indicated by first indication information may be referred to as a unified match entry, and content of the comprehensive behavior entry is not limited to the content shown in FIG. 6. The comprehensive behavior entry may indicate one or more operations. In addition, a quantity of integrated flow entries in the integrated flow table is not limited in this application.

In conclusion, in this embodiment of this application, information that is in a match entry of the flow entry and that is unrelated to matching of a data flow is deleted, and information related to matching of the data flow is reserved, that is, the unified match entry is generated, so that storage space occupied by the flow table is reduced, and more flow tables can be stored when the storage space is limited. This improves a hit rate between a packet and the hardware flow table. In addition, because the data flow can be directly determined based on the unified match entry, a target flow entry can be determined by performing matching on the packet only once, so that packet processing efficiency is improved.

Optionally, before the determining a target flow entry based on the first indication information, the method 500 further includes the following steps.

S501: Obtain a second packet, where the second packet includes second indication information, the second indication information is used to indicate a data flow corresponding to the second packet, and the data flow corresponding to the second packet is specifically a data flow to which the second packet belongs. The second packet may be a packet received by the packet processing apparatus 400 from another device by using the network interface card 402, or may be a packet generated by the packet processing apparatus 400. For example, the packet processing apparatus 400 receives the second packet before receiving the first packet, where the second packet and the first packet are different packets belonging to a same data stream.

S502: Generate the unified match entry based on the second indication information included in the second packet.

S503: The packet processing apparatus 400 performs one or more operations on the second packet by using the OVS 440, to complete forwarding of the second packet. Specifically, the OVS 440 may perform the one or more operations on the second packet based on one or more software flow tables 405 and the CT table 406 in the kernel space 404 of the OVS 440. The packet processing apparatus 400 may specifically perform the one or more operations on the packet by using a kernel module (not shown in FIG. 4) of the OVS 440.

S504: Generate a comprehensive behavior entry based on the operation performed by the OVS 440 on the second packet.

It should be noted that processes of generating the unified match entry and the comprehensive behavior entry, that is, steps S502 and S504 may be implemented by the offload engine 407. The offload engine 407 may be integrated into the OVS 440, or may be implemented as an independent software module or hardware module.

Specifically, in an embodiment, the offload engine 407 extracts the second indication information of the second packet, to generate the unified match entry. For example, the offload engine 407 may extract a subnet identifier and 5-tuple information of the second packet. If there are a plurality of layers of subnets, the offload engine 407 sequentially extracts subnet identifiers of the plurality of layers of subnets, and then combines the subnet identifiers and 5-tuple information, to obtain a unified match entry. The unified match entry may uniquely identify the data flow (which is the same as the data flow to which the first packet belongs) to which the second packet belongs.

Because the second packet and the first packet belong to the same data stream, an operation that needs to be performed to forward the second packet is the same as an operation that needs to be performed to forward the first packet. In an embodiment, the offload engine 407 records a flow entry behavior and a CT behavior that are performed in a process in which the OVS 440 forwards the second packet, and centrally orchestrates the recorded behaviors, to remove an unnecessary behavior and integrate behaviors that can be combined, to generate a comprehensive behavior entry. Finally, the offload engine 407 constructs a complete integrated flow entry based on the generated unified match entry and the generated comprehensive behavior entry, and adds the integrated flow entry to the integrated flow table 403.

In an embodiment, the packet processing apparatus 400 may analyze, by using the virtual switch component 403 in the user space 406, information carried in the second packet, and determine how to process the second packet. The offload engine 407 generates an integrated flow entry according to the method described in S502 and S504, and fills the integrated flow entry into a software integrated flow table located in the kernel space 404. When a subsequent packet (for example, the first packet) of the data flow to which the second packet belongs flows in from the network interface card, the integrated flow entry can be hit in the software integrated flow table based on indication information of the packet. Further, the packet is correspondingly processed based on the integrated flow entry, and does not need to enter the user space 406, so that the packet can be processed more quickly.

In another embodiment, after generating the integrated flow entry and filling the integrated flow entry into the software integrated flow table located in the kernel space 404, the offload engine 407 may offload the software integrated flow table to the network interface card, that is, store the software integrated flow table in a memory of the network interface card 402. When a subsequent packet (for example, the first packet) flows in from the network interface card 402, the integrated flow entry may be hit, based on the indication information of the packet, in the integrated flow table stored in the network interface card 402. Further, the packet is correspondingly processed based on the integrated flow entry, and does not need to enter the OVS 440, so that the packet can be processed more quickly.

In an embodiment, the offload engine 407 may specifically generate the comprehensive behavior entry in the following manners:

S505: Determine, in the operations performed by the OVS 440 on the second packet, a redundancy operation relative to the operation performed to send the second packet only by using the network interface card 402, where the redundancy operation herein is an operation that does not need to be performed when the second packet is directly forwarded by using the network interface card 402.

S506: Generate the comprehensive behavior entry, where the comprehensive behavior entry includes information used to indicate the operations performed by the OVS 440 on the second packet, and the comprehensive behavior entry does not include information used to indicate the redundancy operation, in other words, the generated comprehensive behavior entry includes information used to indicate an operation other than the redundancy operation in the operations performed by the OVS 440 on the second packet.

For example, in a process in which the OVS 440 forwards the second packet, operations of adding and deleting an internal VLAN tag may need to be performed on the second packet, because the second packet needs to pass through a plurality of bridges in the sending process in a software environment (that is, a virtual switch). Therefore, the operations of adding and deleting the internal VLAN tag need to be performed. In a hardware environment (that is, a network interface card), the first packet does not need to pass through a plurality of bridges in a sending process. Therefore, the operations of adding and deleting the internal VLAN tag are meaningless and are redundancy operations, and the two behaviors may be removed when the comprehensive behavior entry is generated.

In this embodiment, redundancy operation information in the comprehensive behavior entry is deleted. Therefore, storage space occupied by a flow table is reduced. When the storage space of the network interface card is limited, the network interface card can store more flow tables, so that a hit rate between a packet and a hardware flow table is improved, and packet processing efficiency is further improved.

In an embodiment, the target flow entry is a flow entry in the hardware flow table, the comprehensive behavior entry includes information used to indicate a CT operation and a VxLAN encapsulation operation, and the performing the at least one operation on the first packet based on a comprehensive behavior entry included in the target flow entry includes the following steps:

S531: Perform the CT operation on the first packet based on the information indicating the CT operation in the comprehensive behavior entry.

S532: Perform, based on the information indicating the VxLAN encapsulation operation in the comprehensive behavior entry, the VxLAN encapsulation operation on the first packet obtained after the CT operation, to generate a third packet.

S533: Send the third packet.

In this embodiment, the network interface card performs an operation on the first packet. Because the hardware flow table stored in the network interface card does not include the information about the redundancy operation, this embodiment can improve efficiency of processing the first packet.

An embodiment of this application further provides a more specific example in which the packet processing apparatus 400 processes a packet based on an integrated flow table.

Figure 7:
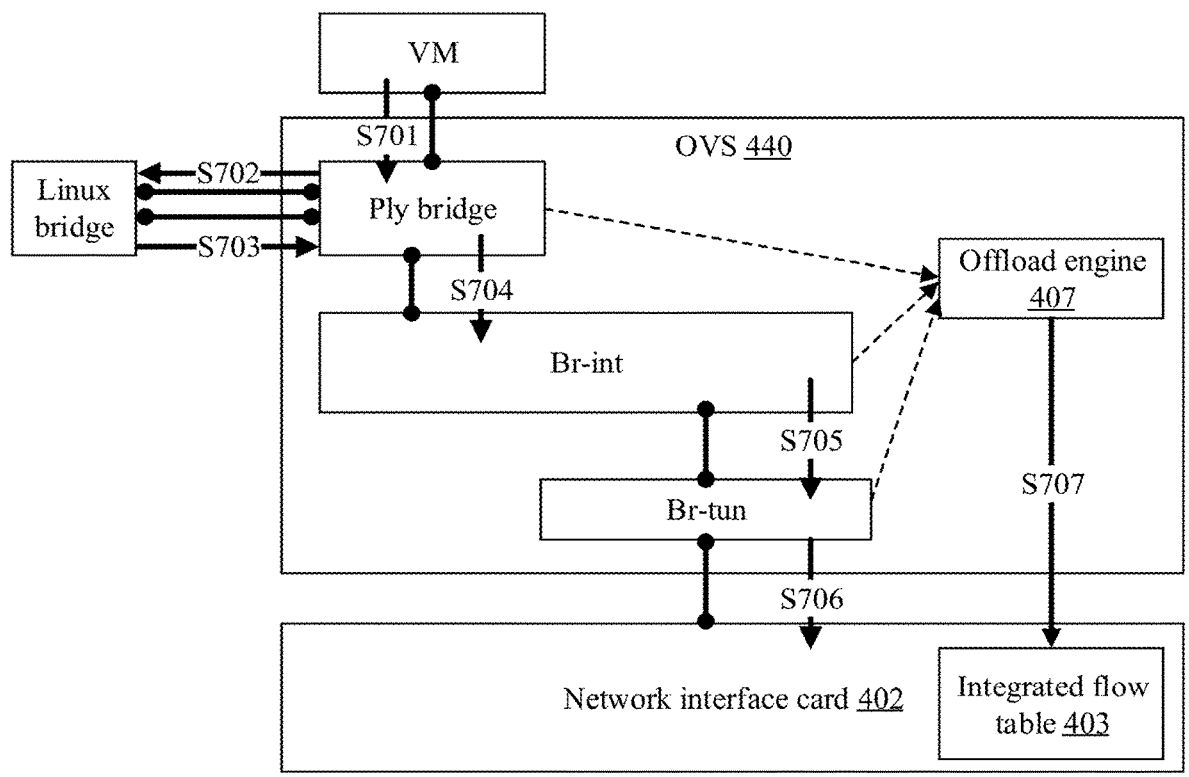
FIG. 7 is a schematic diagram of another packet processing method according to this application.

As shown in FIG. 7, a host on which a VM is located is in a public cloud environment, and the VM generates a packet that needs to be forwarded through two layers. After the packet enters an OVS 440, an offload engine 407 records a processing procedure of the packet.

The processing procedure of the packet is as follows:

S701: The packet enters a policy (policy, ply) bridge from the VM.

S702: The ply bridge sends the packet to a Linux bridge, and the Linux bridge performs a CT operation (CT action) and a security check on the packet.

S703: The packet re-enters the ply bridge, and the ply bridge adds a CT entry to the packet.

S704: Subsequently, the packet enters an integration bridge (br-int), where an internal VLAN tag is added to the cross-host packet entering the br-int.

S705: The packet enters a tunnel bridge (br-tun), where the internal VLAN tag is removed according to a flow table rule, a VNI is added, the packet is encapsulated into a VxLAN packet, and then an external VLAN tag is added.

S706: Send the packet to an external network by using a network interface card 402.

S707: The offload engine 407 centrally orchestrates all flow table behaviors recorded in S701 to S705 into a comprehensive behavior entry, uses 5-tuple information (a source IP address, a source port number, a destination IP address, a destination port number, and a transport layer protocol number) and a subnet identifier of the packet as a unified match entry, to generate an integrated flow entry, and offloads the integrated flow entry to an integrated flow table 403 (that is, a hardware integrated flow table) stored in the network interface card 402.

Figure 8:
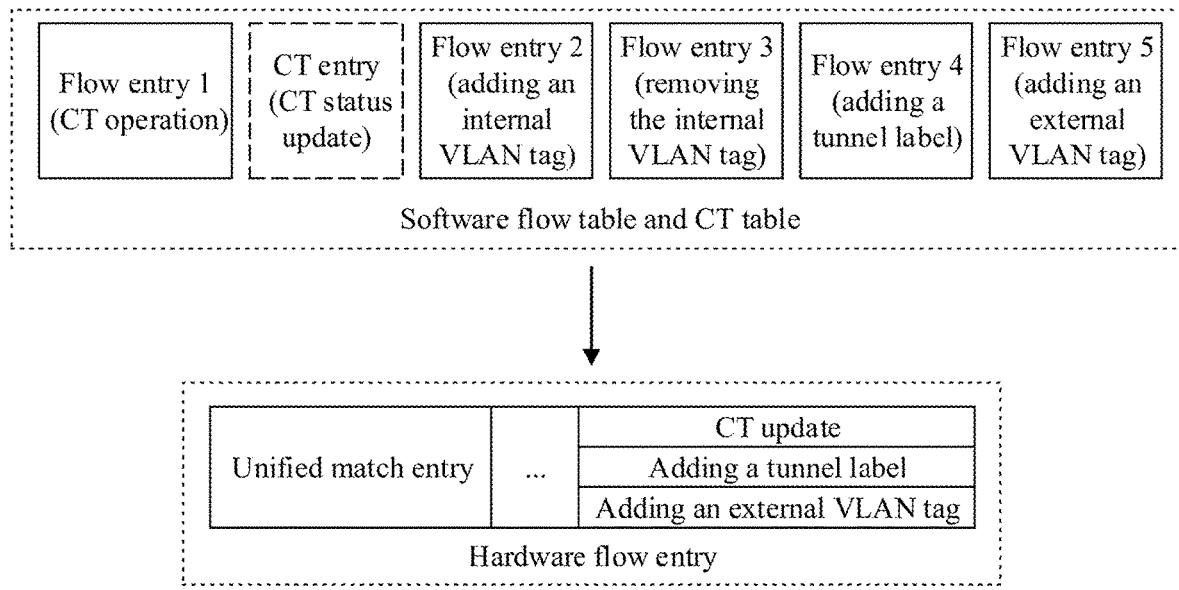
FIG. 8 is a schematic diagram of a method for generating a hardware integrated flow entry according to this application.

FIG. 8 shows an orchestration process of a hardware integrated flow entry. Five times of flow table search performed in an OVS 440 is optimized into one time of flow table search, and six behaviors (five flow table behaviors and one CT behavior) performed in the OVS 440 are comprehensively orchestrated into three behaviors in a hardware integrated flow table. Because a packet does not need to jump between a plurality of bridges in a network interface card, operations of adding and removing an internal VLAN tag performed in the OVS 440 are omitted. In addition, a CT operation and an operation of adding a CT entry to the packet are integrated into one behavior, so that packet processing efficiency is improved.

After a subsequent packet flows from a VM into the network interface card 402 through single root input/output virtualization (SRIOV), the network interface card 402 searches a hardware integrated flow table 403 for a corresponding integrated flow entry based on 5-tuple information and a subnet identifier that are carried in the packet. If the corresponding integrated flow entry is hit, the network interface card 402 directly processes the subsequent packet based on a comprehensive behavior entry in the integrated flow entry, and does not need to send the subsequent packet to the OVS 440.

The foregoing describes in detail examples of the method, provided in this application, for processing a packet based on an integrated flow table. It may be understood that, to implement the foregoing functions, the packet processing apparatus includes corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that such implementation goes beyond the scope of this application.

In this application, the packet processing apparatus may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, unit division in this application is exemplary, and is merely logical function division. During actual implementation, another division manner may be used.

Figure 9:
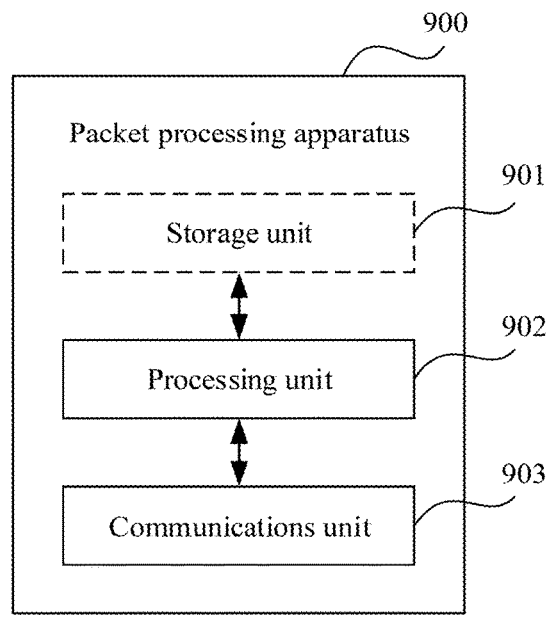
FIG. 9 is a schematic diagram of another packet processing apparatus according to this application.

When an integrated unit is used, FIG. 9 is a possible schematic structural diagram of the packet processing apparatus in the foregoing embodiments. The packet processing apparatus 900 includes a processing unit 902 and a communications unit 903. The communications unit 903 is configured to obtain a packet. The processing unit 902 is configured to: determine a target flow entry from an integrated flow table based on indication information of the packet obtained by the communications unit 903, and perform at least one operation on the first packet based on a comprehensive behavior entry included in the target flow entry, where the target flow entry is a flow entry, in an integrated flow table, in which a data flow identified by a unified match entry is the same as a data flow indicated by the indication information. For a structure of the integrated flow table and related details of functions implemented by the processing unit 902 and the communications unit 903, refer to the foregoing embodiments, for example, the embodiment related to S510 to S530. In an embodiment, the packet processing apparatus 900 further includes a storage unit 901, configured to store an integrated flow table and a program or an instruction. When the program or the instruction is executed by a processor, functions of the processing unit 902 and the communications unit 903 are implemented.

In an embodiment, the processing unit 902 may be a processor or a controller, for example, a CPU, a general-purpose processor, a digital signal processor (DSP), an application-specific integrated circuit (ASIC), a field programmable gate array (FPGA) or another programmable logic device, a transistor logic device, a hardware component, or any combination thereof. The storage unit 901 may be a random access memory (RAM), a flash memory, a read-only memory (ROM), an erasable programmable read-only memory (EPROM), or an electrically erasable programmable read-only memory (EEPROM), a register, or any other form of storage medium well known in the art. The communications unit 903 may be a component that has a data receiving and sending function, such as a receiving circuit, a receiver, or an I/O interface.

In an embodiment, the storage unit 901, the processing unit 902, and the communications unit 903 may be integrated into a hardware device, for example, the network interface card 402 shown in FIG. 4 and FIG. 7. For example, the storage unit 901 may be specifically a memory of the network interface card 402, the processing unit 902 may be a processor of the network interface card 402, and the communications unit 903 may be a port, a receiver, or an I/O interface of the network interface card 402.

In an embodiment, the packet processing apparatus 900 further includes a virtual switch, configured to perform a corresponding operation on a packet based on one or more software flow tables maintained by the virtual switch, to complete forwarding of the packet. In an embodiment, if the processing unit 902 does not hit the target flow entry in the integrated flow table based on the indication information of the packet obtained by the communications unit 903, the processing unit 902 forwards the packet to the virtual switch. The virtual switch further performs a corresponding operation on the packet based on the software flow table, to complete forwarding of the packet. In an embodiment, the virtual switch may be the OVS 440 described in the foregoing embodiments. For implementation details of the virtual switch, refer to the foregoing embodiments.

In an embodiment, the packet processing apparatus 900 further includes an offload engine, configured to generate a flow entry in the foregoing integrated flow table. Specifically, the offload engine tracks all operations performed by the virtual switch on the packet when the virtual switch forwards the packet, namely, behavior entries indicated by all flow entries hit by the packet; and comprehensively orchestrates these behavior entries into a comprehensive behavior entry. In addition, the indication information of the packet is extracted to construct a unified match entry, to uniquely identify a data flow (or connection) to which the packet belongs. Then, an integrated flow entry is generated based on the unified match entry and the comprehensive behavior entry, and the generated integrated flow entry is added to the integrated flow table. In an embodiment, the offload engine included in the packet processing apparatus 900 may be the offload engine 407 described in the foregoing embodiments. For specific details of generating the integrated flow entry by the offload engine, refer to the foregoing embodiments, for example, the embodiments related to FIG. 4 to FIG. 8.

In an embodiment, the offload engine is integrated, as a software module or program, into a virtual switch included in the packet processing apparatus 900, and when the software module or program is executed by a processor, a corresponding function is implemented. In another embodiment, the offload engine may alternatively be integrated into the network interface card as a software module or program, and when the software module or program is executed by a processor of the network interface card, a corresponding function is implemented. In another embodiment, a function of the offload engine may be implemented by using a DSP, an ASIC, an FPGA or another programmable logic device, a transistor logic device, a hardware component, or any combination thereof. Hardware that implements the function of the offload engine may be integrated into the network interface card of the packet processing apparatus 900.

Figure 10:
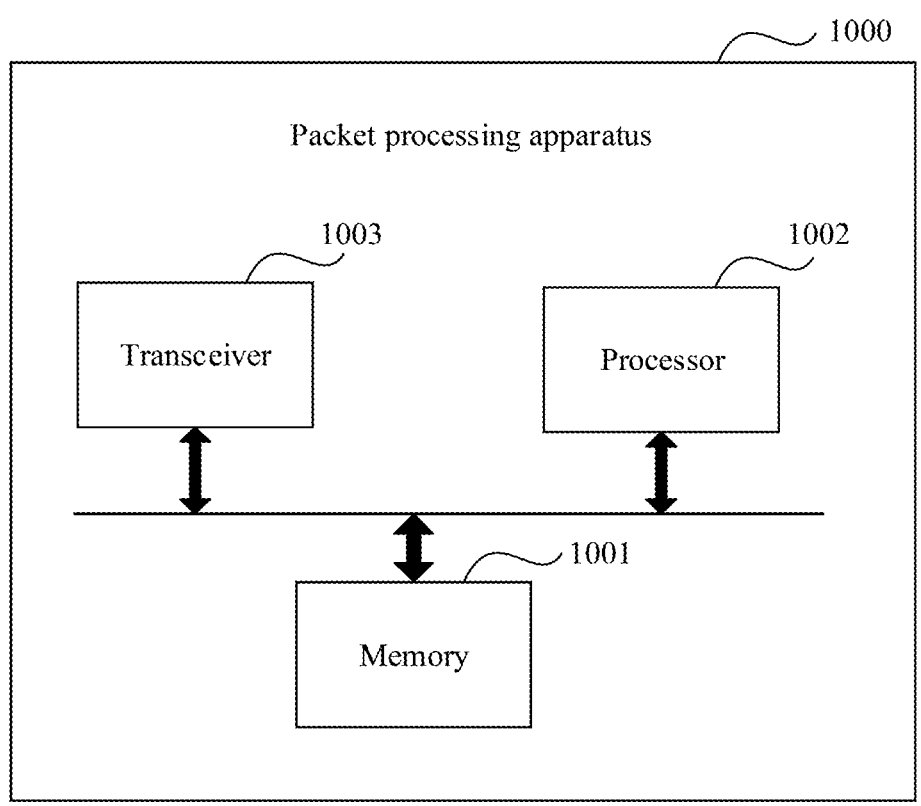
FIG. 10 is a schematic diagram of still another packet processing apparatus according to this application.

Referring to FIG. 10, an embodiment of this application further provides another packet processing apparatus 1000. The apparatus 1000 includes a processor 1002, a communications interface 1003, and a memory 1001. The communications interface 1003, the processor 1002, and the memory 1001 may communicate with each other through an internal connection, to transfer a control signal and/or a data signal.

It may be clearly understood by a person skilled in the art that, for ease of brief description, for detailed working processes of the foregoing apparatuses and units, refer to corresponding processes in the foregoing method embodiments, and details are not described herein again.

For example, the communications interface may be a communications interface of the network interface card. The memory may be an independent device, or may be integrated into the processor. All or some of the foregoing components may be integrated into a chip for implementation.

It should be understood that the packet processing apparatus 1000 may implement the steps of the method 500 by using general-purpose software, or may implement the steps of the method 500 by using dedicated software (for example, a virtual machine and an OVS). When the virtual machine and the OVS are installed on the packet processing apparatus 1000, the packet processing apparatus 1000 is equivalent to any one of the node 1, the node 2, and the node 3 shown in FIG. 1.

The packet processing apparatus 1000 may alternatively be a network interface card. In this case, the packet processing apparatus 1000 processes a received packet based on a hardware flow table stored in the memory 1001. The packet may be a packet generated by a host in which the network interface card is located, or may be a packet that is sent by another host and that is received by the network interface card.

The packet processing apparatus 900 and the packet processing apparatus 1000 that are provided in this application process a packet based on a unified match entry, so that storage space occupied by a flow table is reduced. When storage space of a network interface card is limited, the network interface card can store more flow tables, so that a hit rate between a packet and a hardware flow table is improved. In addition, because a data flow can be directly determined based on the unified match entry, a target flow entry can be determined by performing matching on the packet only once, so that packet processing efficiency is improved.

It should be understood that sequence numbers of the foregoing processes do not mean execution sequences in various embodiments of this application. The execution sequences of the processes should be determined based on functions and internal logic of the processes, and should not be construed as any limitation on the implementation processes of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Method or algorithm steps described in combination with the content disclosed in this application may be implemented by hardware, or may be implemented by a processor by executing a software instruction. The software instruction may include a corresponding software module. The software module may be stored in a RAM, a flash memory, a ROM, an EPROM, an EEPROM, a register, a hard disk, a removable hard disk, a compact disc read-only memory, or any other form of storage medium well known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in the packet processing apparatus. Certainly, the processor and the storage medium may exist in the packet processing apparatus as discrete components.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state disk (SSD)), or the like.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement or improvement made based on technical solutions of this application shall fall within the protection scope of this application.

What is claimed is:

1. A packet processing method comprising:
   obtaining, by a packet processing apparatus, a first packet comprising first information indicating a data flow associated with the first packet and a second packet comprising second information indicating a data flow associated with the second packet;
   storing, by the packet processing apparatus, an integrated flow table comprising at least one flow entry,
      wherein each of the at least one flow entry comprises a unified match entry and a comprehensive behavior entry,
      wherein the unified match entry uniquely identifies a data flow,
      wherein the comprehensive behavior entry indicates at least one operation performed on a packet in the data flow identified by the unified match entry;
      wherein the comprehensive behavior entry is based on at least one operation performed on the second packet, and
      wherein the at least one operation includes (1) determining a redundancy operation in the at least one operation performed on the second packet unless the second packet is being forwarded from a network interface card of the packet processing apparatus or (2) tracking all flow tables and connection track tables passed through by the second packet;
   determining, by the packet processing apparatus, a target flow entry in the integrated flow table based on the first information,
      wherein the unified match entry of the target flow entry identifies the data flow associated with the first packet; and
   performing, by the packet processing apparatus, the at least one operation on the first packet based on the comprehensive behavior entry comprised in the target flow entry.

2. The method according to claim 1, wherein the data flow associated with the second packet is the same as the data flow associated with the first packet; and wherein the method further includes:
   generating the unified match entry based on the second information.

3. The method according to claim 1, wherein a virtual switch in the packet processing apparatus performs the at least one operation on the second packet and wherein the at least one operation completes forwarding of the second packet; and wherein the comprehensive behavior entry is generated based on the at least one operation performed by the virtual switch on the second packet.

4. The method according to claim 1, wherein the comprehensive behavior entry comprises information indicating an operation other than the redundancy operation in the at least one operation performed by the virtual switch on the second packet based on the comprehensive behavior entry being based on the at least one operation.

5. The method according to claim 1, wherein the redundancy operation comprises operations of adding and deleting an internal virtual local area network (VLAN) tag.

6. The method according to claim 1, wherein upon the at least one operation comprising tracking all flow tables and connection track (CT) tables, the at least one operation further comprises:
   integrating all the behavior entries, which are performed on the second packet and that are in all the flow tables and CT tables, to obtain the comprehensive behavior entry.

7. The method according to claim 1, wherein the second packet is an initial packet in the data flow.

8. The method according to claim 1, wherein the unified match entry comprises a source internet protocol (IP) address, a source port number, a destination IP address, a destination port number, a transport layer protocol number, and a subnet identifier that is associated with the data flow.

9. The method according to claim 1, wherein the integrated flow table is stored in a network interface card of the packet processing apparatus.

10. The method according to claim 1, wherein the comprehensive behavior entry comprises information indicate a connection track (CT) operation and a virtual extensible local area network (VxLAN) encapsulation operation, and performing the at least one operation on the first packet based on the comprehensive behavior entry comprised in the target flow entry comprises:
    performing the CT operation on the first packet based on the information indicating the CT operation in the comprehensive behavior entry;
    performing, based on the information indicating the VxLAN encapsulation operation in the comprehensive behavior entry, the VxLAN encapsulation operation on the first packet obtained after the CT operation, to generate a third packet; and
    sending the third packet.

11. A packet processing apparatus comprising:
a receiver, a memory and a processor, wherein the receiver and the processor are integrated into a network interface card and wherein the receiver is configured to cooperate with the processor to obtain a first packet comprising first information indicating a data flow associated with the first packet and obtain a second packet comprising second information indicating the data flow is also associated with the second packet;
the memory is configured to store an integrated flow table comprising at least one flow entry, wherein each of the at least one flow entry comprises a unified match entry and a comprehensive behavior entry, wherein the unified match entry uniquely identifies a data flow, and wherein the comprehensive behavior entry indicates at least one operation performed on a packet in the data flow identified by the unified match entry;
the processor is configured to:
determine a target flow entry in the integrated flow table based on the first information, wherein the unified match entry of the target flow entry identifies the data flow associated with the first packet; and
perform the at least one operation on the first packet based on a comprehensive behavior entry comprised in the target flow entry; and
an offload engine configured to:
determine a redundancy operation in at least one operation performed by a virtual switch on the second packet;
not perform the redundancy operation in response to the second packet being forwarded by using the network interface card; and
generate the comprehensive behavior entry indicating the at least one operation performed on the packet in the data flow identified by the unified match entry, wherein the indicated at least one operation is other than the redundancy operation.

12. The apparatus according to claim 11, wherein the offload engine is configured to generate the unified match entry based on the second information comprised in the second packet.

13. The apparatus according to claim 11, wherein the receiver is further configured to send the second packet to the virtual switch,
wherein the virtual switch is configured to perform at least one operation on the second packet to complete forwarding of the second packet, and
wherein the offload engine is further configured to generate the comprehensive behavior entry based on the at least one operation performed by the virtual switch on the second packet.

14. The apparatus according to claim 11, wherein the redundancy operation comprises operations of adding and deleting an internal virtual local area network (VLAN) tag.

15. The apparatus according to claim 11, wherein the offload engine is further configured to:
track all flow tables and connection track (CT) tables that are passed through by the second packet in the virtual switch in order to sequentially record all behavior entries that are performed on the second packet and that are in all the flow tables and CT tables; and
integrate all the behavior entries that are performed on the second packet and that are in all the flow tables and CT tables, to obtain the comprehensive behavior entry.

16. The apparatus according to claim 11, wherein the second packet is an initial packet in the data flow.

17. The apparatus according to claim 11, wherein the unified match entry comprises a source internet protocol (IP) address, a source port number, a destination IP address, a destination port number, a transport layer protocol number, and a subnet identifier that is associated with the data flow.

18. The apparatus according to claim 11, wherein the integrated flow table is stored in a network interface card of the packet processing apparatus.

19. The apparatus according to claim 11, wherein the comprehensive behavior entry comprises information indicating a connection track (CT) operation and a virtual extensible local area network (VxLAN) encapsulation operation, and the receiver is configured to:
perform the CT operation on the first packet based on the information indicating the CT operation in the comprehensive behavior entry;
perform, based on the information indicating the VxLAN encapsulation operation in the comprehensive behavior entry, the VxLAN encapsulation operation on the first packet obtained after the CT operation, to generate a third packet; and
send the third packet.

20. A packet processing apparatus comprising:
a receiver, a memory and a processor;
the memory is configured to store an integrated flow table comprising at least one flow entry, wherein each of the at least one flow entry comprises a unified match entry and a comprehensive behavior entry comprising information indicating a connection track (CT) operation and a virtual extensible local area network (VxLAN) encapsulation operation, wherein the unified match entry uniquely identifies a data flow, and wherein the comprehensive behavior entry indicates at least one operation performed on a packet in the data flow identified by the unified match entry; and
the processor and the receiver are configured to cooperate and provide at least the following operations:
obtain a first packet comprising first information indicating a data flow associated with the first packet and obtain a second packet comprising second information indicating the data flow is also associated with the second packet;
determine a target flow entry in the integrated flow table based on the first information, wherein the unified match entry of the target flow entry identifies the data flow associated with the first packet;
perform the at least one operation on the first packet based on a comprehensive behavior entry comprised in the target flow entry;
perform the CT operation on the first packet based on the information indicating the CT operation in the comprehensive behavior entry;
perform, based on the information indicating the VxLAN encapsulation operation in the comprehensive behavior entry, the VxLAN encapsulation operation on the first packet obtained after the CT operation to generate a third packet; and
send the third packet.

* * * * *